United States Patent [19]

Laarhoven

[11] Patent Number: 4,496,263

[45] Date of Patent: Jan. 29, 1985

[54] COUPLING DEVICE FOR COUPLING PANELS AND LIKE STRUCTURAL MEMBERS

[75] Inventor: Franciscus L. Laarhoven, The Hague, Netherlands

[73] Assignee: Laarhoven Design B. V., Zoeterwoude, Netherlands

[21] Appl. No.: 390,899

[22] Filed: Jun. 22, 1982

[30] Foreign Application Priority Data

Jun. 23, 1981 [NL] Netherlands .................. 8103030

[51] Int. Cl.³ ............................................. F16B 5/06
[52] U.S. Cl. ................................. 403/402; 403/405; 403/231; 403/205; 52/309.11; 160/229 R
[58] Field of Search ............... 403/401, 402, 403, 405, 403/231, 205; 52/309.11, 483, 480, 582, 584, 285, 127.7, 239; 256/26; 160/229 R, 135

[56] References Cited

U.S. PATENT DOCUMENTS

| | | | |
|---|---|---|---|
| 2,282,559 | 5/1942 | Byers | 52/584 |
| 3,092,870 | 6/1963 | Baer | 160/229 R |
| 3,514,893 | 6/1970 | Paksy | 160/229 R |

FOREIGN PATENT DOCUMENTS

| | | |
|---|---|---|
| 218460 | 12/1927 | Fed. Rep. of Germany . |
| 997902 | 1/1952 | France . |
| 36344 | 4/1965 | German Democratic Rep. .................. 403/231 |
| 265089 | 2/1927 | United Kingdom ............. 403/403 |
| 614159 | 12/1948 | United Kingdom . |
| 1542244 | 3/1979 | United Kingdom . |

Primary Examiner—Cornelius J. Husar
Assistant Examiner—Joseph A. Fischetti
Attorney, Agent, or Firm—Kenyon & Kenyon

[57] ABSTRACT

A coupling device for coupling structural members, such as panels, wall members and frame members, in edge-to-edge relationship. The device comprises a coupling member capable of cooperating with at least two edges to be connected to lock the same together and at least one coupling pin provided in each member to be connected, said pin extending longitudinally of an edge of said member and being spaced inwardly thereof. The edge is formed with faces forming chord planes of an imaginary cylinder whose axis coincides with that of the pin. The coupling member is provided with clip-on means for engagement around at least two adjacent pins thereby holding two adjacent edge faces in contact with each other, and fixing the structural members relatively to each other.

6 Claims, 6 Drawing Figures

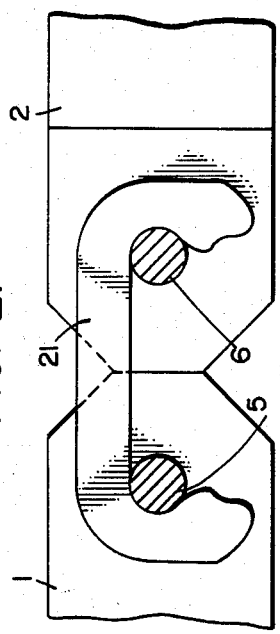
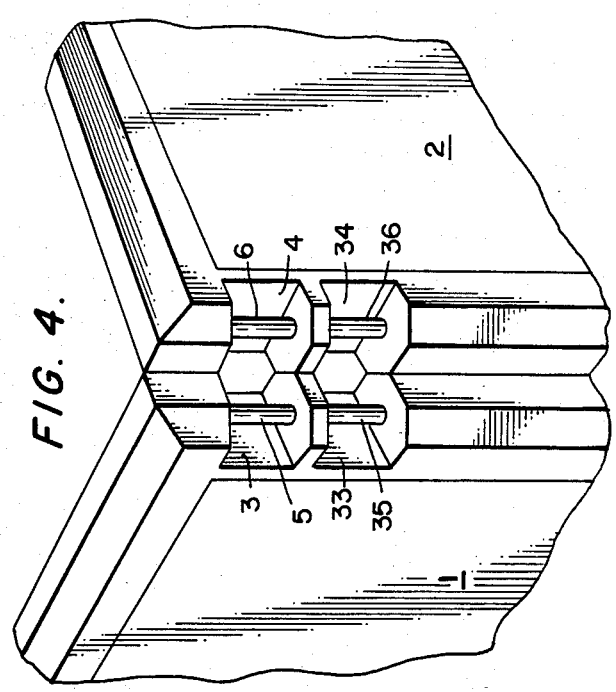
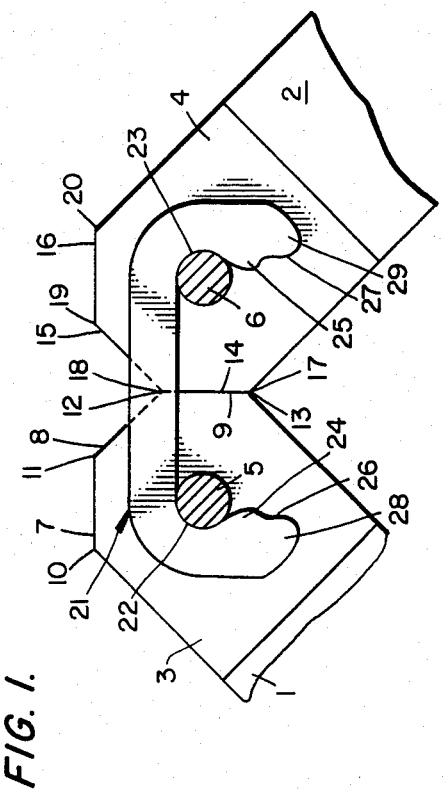
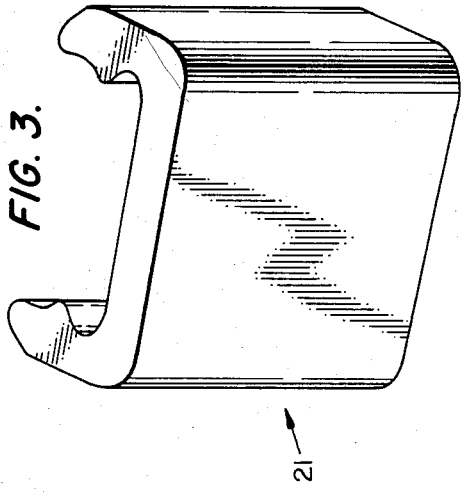

COUPLING DEVICE FOR COUPLING PANELS AND LIKE STRUCTURAL MEMBERS

This invention relates to a coupling device for coupling structural members, such as panels, wall members and frame members, in edge-to-edge relationship, comprising a coupling member capable of cooperating with at least two edges to be connected to lock the same together.

For coupling panels, wall members, frame members and like structural members together, for example, for making walls on exhibitions, various coupling devices are known. These, however, often can be mounted and dismounted with difficulty only, using one or more tools, or are of complex construction, or expensive on account of design and/or use of material, or too heavy in weight, or can be mounted and dismounted by instructed persons only.

It is an object of the present invention to provide a coupling device that is simple and light of construction, comprises a minimum of parts, in particular loose parts, is relatively inexpensive, and can be mounted and dismounted by anyone.

In accordance with the present invention, there is accordingly provided a coupling device for coupling structural members, such as panels, wall members and frame members, in edge-to-edge relationship, comprising a coupling member capable of cooperating with at least two edges to be connected to lock the same together, characterized by at least one coupling pin provided in each member to be connected, said pin extending longitudinally of an edge of said member and being spaced inwardly thereof, said edge being formed with faces forming chord planes of an imaginary cylinder whose axis coincides with that of the pin, said coupling member being provided with clip-on means for engagement around at least two adjacent pins, thereby holding two adjacent edge faces in contact with each other, and fixing the structural members relatively to each other.

The coupling device according to the invention makes it possible, using only one loose part, to effect a connection between two edges of structural members in an extremely simple manner, namely, by clipping the coupling member to the two pins. The adjacent edge faces are thus pressed together, and the two members are fixed relatively to each other. The coupling member may be of simple design and, if made for example of synthetic plastics material, inexpensive and light in weight.

In order to optimize these advantages, it is preferable, in accordance with a further embodiment of the invention, for the coupling member to comprise a substantially U-shaped body, with a clip-on recess for receiving a pin being provided at the two junctions between the web and the legs of the U.

In a further embodiment of the invention, each edge to be coupled is formed with three consecutive chord faces, the middle one of which forms a perpendicular end face of the structural member, and the two others enclose an angle of 135° with the end face. This provides an extremely stable construction which in addition has an aesthetic appearance, and makes it possible for the structural members to be coupled together in alignment with, and at right angles to each other.

A greater variability as regards the positions which the structural members can occupy relative to each other in their coupled position is provided, in accordance with a further preferred embodiment of the invention, if each edge to be coupled comprises seven consecutive chord faces, the middle one of which forms a perpendicular end face of the structural member, with the further faces extending symmetrically on both sides thereof each at an angle of 157.5° to the adjacent face, with the faces being provided with longitudinal grooves. This last feature serves for increasing the frictional resistance between two contacting faces of two edges to be connected. This increase in frictional resistance is preferred because, for example, with the normally used frame edges of panels for, for example, walls used on exhibitions, in an embodiment comprising seven chord faces, the width of the contacting faces would come to be in such an order of magnitude that, depending on materials and dimensions selected, problems of stability, for example, in setting-up the walls, could present themselves in some cases. As regards the longitudinal grooves to be provided, these may be, for example, scored grooves with a depth of, for example, 0.5 mm. Pursuing this route, according to a further elaboration of the invention, each edge may be semi-circular, and provided with longitudinal knurls. In this way there are in principle provided an indefinite number of chord faces, with the positional stability being insured by the knurling.

A further stabilization of the construction can be provided if, in accordance with a further feature of the invention, a recess is formed in an edge of a structural member at the position of a coupling pin, said recess having a height substantially equal to that of the coupling member. By virtue of these features, there is also provided for fixation in longitudinal direction without extra parts.

In a further embodiment of the invention, two recesses are formed in an edge of a structural member in the vicinity of each other. This provides the possibility of making a stable, fixed construction in the form of a T, a cross, or, depending on the shape of the selected edge faces, a different form, in which more than two structural members are placed in edge-two-edge contact with each other.

In a further preferred embodiment of the invention, the legs of the coupling member form a first clamping face adjacent their free ends, each clamping face being followed by a locking projection, which in turn is followed by a clip-on recess. This makes it possible, in setting-up the structural members, to place these first in a provisional relative position by interconnecting them using the first clamping faces of the coupling members. If during the setting-up procedure, it is considered desirable for a structural member already placed in position to be given a different position, this can be done extremely rapidly by detaching the coupling member, which is in a clamping, but non-fixed position, and to change the position of the structural member. When the arrangement is definitive, all coupling members can be pressed into their fixed position beyond the locking projections.

Some embodiments of the invention will now be described by way of example, with reference to the accompanying drawings. In said drawings, FIG. 1 is a cross-sectional view of two coupled walls, placed at right angles to each other;

FIG. 2 is a cross-sectional view of two coupled walls located in alignment with each other, and using the same coupling member as used in FIG. 1;

FIG. 3 is a perspective view of the coupling member used in the arrangements of FIGS. 1 and 2;

FIG. 4 is a perspective view of two walls to be coupled together at right angles to each other before the application of a coupling member;

Figure 5:
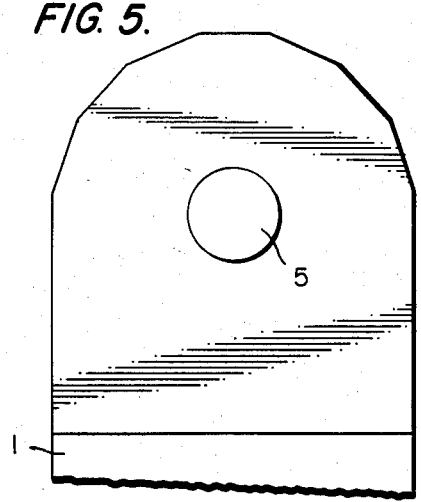
FIG. 5 shows a second embodiment of the edge of the wall.

FIG. 1 shows two walls 1 and 2 placed at right angles to each other, each formed with a recess 3,4, respectively in its longitudinal edge. The shape of recesses 3 and 4 is best shown in the perspective view of FIG. 4. This figure also shows the location of coupling pins 5,6, which extend through-out the entire height of recesses 3,4, and are anchored in the wall.

Wall 1 is provided with three longitudinal faces 7,8 and 9, which form chord plane of an imaginary cylinder having the axis of pin 5 for its longitudinal axis. This means that vertices 10, 11, 12 and 13 are all equidistantly spaced from the longitudinal axis of pin 5. Wall 2 is provided with similar longitudinal faces 14,15 and 16 and vertices 17,18,19 and 20.

A coupling member 21 has a substantially U-shaped body, which on the inside at the junction between the legs and the body section comprises recesses 23 and 23 shaped to snugly receive coupling pins 5 and 6, and retaining them in position by means of locking projections 24,25. The coupling member 21 is accordingly applied around pins 5 and 6 by causing the legs of the U-shaped body of coupling member 21 to yield resiliently apart. Contiguous with locking projections 24,25, the legs of coupling member 21 are provided with clamping faces 26, 27, respectively, which merge into rounded corners 28, 29, respectively. When walls 1 and 2 are placed in position; these can first be provisionally coupled together by causing clamping faces 26 and 27 to engage with coupling pins 5 and 6. Should it later be found that, for any reason whatsoever, the position of one of the walls relative to the other has to be changed, the coupling member 21 is readily removed to permit adjustment, whereafter the walls are again provisionally locked. When the walls are in their definitive position, the coupling members 21 are all pressed into a position shown in FIGS. 1 and 2, whereby the walls are locked and fixed in position.

This embodiment provides an esthetically attractive, easily applied, and effectively fixing coupling device with a minimum of parts, and also a light and relatively inexpensive construction.

In FIG. 2, the walls 1 and 2 are shown to be in alignment with each other and interconnected by means of coupling member 21.

FIG. 3 shows the coupling member 21 in the position in which it should be held for provisionally coupling or locking the coupling walls 1 and 2 as shown in FIG. 4 with a single movement.

In the embodiment of FIG. 4, a second recess 33 is provided just under recess 3 in the longitudinal edge of wall 1, and a similar recess 34 is provided at the same level under recess 4. Coupling pins 35 and 36 are mounted in the respective recesses 33 and 34. By means of these extra recesses and coupling pins, the angular arrangement shown can be extended to a T-form or a cruciform configuration, depending on the user's wishes. A third and/or fourth wall is then coupled in the same way as the walls 1 and 2 are coupled together. Naturally, recesses 3 and 33, and 4 and 34 may alternatively be formed as a single continuous recess, with a single continuous pin.

FIG. 5 shows a variant of the above end face of wall 1. In it, the end face exhibits 7 chord faces, rather than 3, which all enclose an angle of 157.5° with each other. By virtue of this configuration of the end face, the number of positions in which two walls may be placed relatively to each other is considerably increased, as they can now also be positioned at an angle of 45° or 135°. As, however, the provision of seven, instead of three, chord surfaces reduces the contacting area between two walls to be coupled together, it is preferable for the chord faces to be provided with longitudinal grooves, not shown, for example, in the form of scored grooves having a depth in the order of for example, 0.5 mm.

Figure 6:
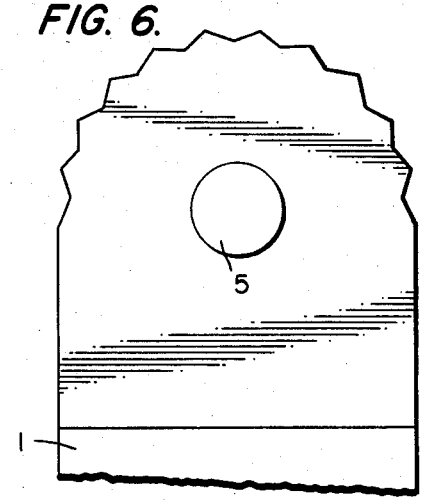
FIG. 6 shows a further embodiment of the edge of the wall.

The number of possible positions of two walls relative to each other can be increased still further if, as shown in FIG. 6, the end face of a wall is formed substantially semi-cylindrical, with a knurling being formed to provide sufficient mutual contact between two walls.

Naturally, many modifications and variants can be made without departing from the scope of the invention. Thus, for example, FIG. 4 shows wall 1 as a wall panel framed in a surrounding profile. Naturally, it is also possible for such profile to be assembled from four corner pieces with longitudinal sections connecting these. Furthermore, it is possible for the corner pieces to be provided with recesses and appurtenant pins in both legs of the corner pieces.

I claim:

1. An arrangement for coupling structural members, such as panels, wall members and frame members, in edge-to-edge relationship, the arrangement comprising:

a coupling member for cooperating with at least two edges to be connected to lock the structural members together;

at least one coupling pin provided in each of the structural members to be coupled, said coupling pin having an axis extending longitudinally substantially along an edge of an associated structural member and being spaced inwardly thereof, said edge being formed with faces arranged radially exterior of said axis of said coupling pin and forming an odd number of successive chord planes of an imaginary cylinder having an axis which coincides with that of said coupling pin, the middle one of said chord planes forming a perpendicular end face of the structural member, with the remaining planes forming faces that extend symmetrically on both sides thereof at one and the same angle to the adjacent face, and with each face being provided with longitudinal grooves; and said coupling member being provided with clip-on means for engaging around at least two adjacent coupling pins, for holding two adjacent edge faces in contact with each other, and fixing the structural members with respect to each other, said coupling member having a substantially U-shaped body in cross section formed by a web portion and two legs, and said clip-on means comprising a pair of clip-on recesses for engaging respective coupling pins of two of said structural members, each clip-on recess being formed at the inside corner of the junction between the web portion and a respective one of the legs, a locking projection on the inner surface of each leg adjacent to the respective clip-on recess, and a pair of inner faces located at the free edges of the legs, the pair of inner faces being spaced apart by a distance at least equal to the spacing of the clip-on recesses to facilitate mounting the clip-on members onto said coupling pins.

2. A coupling device according to claim 1, wherein each edge to be coupled is formed with three consecutive chord faces, the middle of which forms a perpendicular end face of the structural member, and the two others of which enclose an angle of 135° with said end face.

3. A coupling device according to claim 1, wherein each edge to be coupled comprises seven consecutive chord faces, the middle one of which forms a perpendicular end face of the structural member, with the remaining faces extending symmetrically on both sides thereof each at an angle of 157.5° to the adjacent face.

4. A coupling device according to claim 1, characterized by a recess formed in an edge of a structural member at the position of a coupling pin, said recess having a height at least equal to that of the coupling member.

5. A coupling device according to claim 4, wherein two recesses are formed in an edge of a structural member in the vicinity of each other.

6. A system of structural members, such as panels, wall members and frame members, comprising and adapted to be coupled by, a suitable member of coupling devices as claimed in any of the preceding claims.

* * * * *